(12) United States Patent
Kumar et al.

(10) Patent No.: US 10,237,379 B2
(45) Date of Patent: *Mar. 19, 2019

(54) HIGH-EFFICIENCY SERVICE CHAINING WITH AGENTLESS SERVICE NODES

(71) Applicant: Cisco Technology, Inc., San Jose, CA (US)

(72) Inventors: Surendra M. Kumar, San Ramon, CA (US); Nagaraj A. Bagepalli, Fremont, CA (US); Abhijit Patra, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,768

(22) Filed: Sep. 21, 2017

(65) Prior Publication Data
US 2018/0027101 A1  Jan. 25, 2018

Related U.S. Application Data

(63) Continuation of application No. 14/305,810, filed on Jun. 16, 2014, now Pat. No. 9,794,379.

(51) Int. Cl.
*H04L 29/06* (2006.01)
*H04L 12/46* (2006.01)
(Continued)

(52) U.S. Cl.
CPC .......... *H04L 69/22* (2013.01); *H04L 12/4641* (2013.01); *H04L 45/302* (2013.01); *H04L 45/586* (2013.01)

(58) Field of Classification Search
USPC ....................................................... 370/392
See application file for complete search history.

(56) References Cited

U.S. PATENT DOCUMENTS

| 3,629,512 A | 12/1971 | Yuan |
| 4,769,811 A | 9/1988 | Eckberg, Jr. et al. |

(Continued)

FOREIGN PATENT DOCUMENTS

| CN | 103716123 | 4/2014 |
| CN | 103716137 | 4/2014 |

(Continued)

OTHER PUBLICATIONS

Aldrin, S., et al. "Service Function Chaining Operation, Administration and Maintenance Framework," Internet Engineering Task Force, Oct. 26, 2014, 13 pages.

(Continued)

*Primary Examiner* — Bunjob Jaroenchonwanit
(74) *Attorney, Agent, or Firm* — Polsinelli PC

(57) ABSTRACT

An example method for distributed service chaining is provided and includes receiving a packet belonging to a service chain in a distributed virtual switch (DVS) network environment, the packet includes a network service header (NSH) indicating a service path identifier identifying the service chain. The packet is provided to a virtual Ethernet module (VEM) connected to an agentless service node (SN) providing an edge service such as a server load balancer (SLB). The VEM associates a service path identifier corresponding to the service chain with a local identifier such as a virtual local area network (VLAN). The agentless SN returns the packet to the VEM for forwarding on the VLAN. Because the VLAN corresponds exactly to the service path and service chain, the packet is forwarded directly to the next node in the service chain. This can enable agentless SNs to efficiently provide a service chain for network traffic.

19 Claims, 11 Drawing Sheets

(51) Int. Cl.
*H04L 12/725* (2013.01)
*H04L 12/713* (2013.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta et al. |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |

(56) References Cited

U.S. PATENT DOCUMENTS

| | | |
|---|---|---|
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1* | 3/2010 | Khalid .................. G06F 15/16 709/202 |
| 2010/0080226 A1* | 4/2010 | Khalid ................ H04L 41/5003 370/392 |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1* | 5/2013 | Feng .................... H04L 45/586 370/221 |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |

(56) References Cited

U.S. PATENT DOCUMENTS

| | | |
|---|---|---|
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipidia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "Understanding Azure, a Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.

Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.

Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.

Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.

Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.

Baird, Andrew, et al. "AWS Serverless Multi-Tier Architectures; Using Amazon API Gateway and AWS Lambda," Amazon Web Services Inc., Nov. 2015, 20 pages.

(56) References Cited

OTHER PUBLICATIONS

Boucadair, Mohamed, et al., "Differentiated Service Function Chaining Framework," Network Working Group Internet Draft draft-boucadair-network-function-chaining-03, Aug. 21, 2013, 21 pages.
Cisco Systems, Inc. "Cisco NSH Service Chaining Configuration Guide," Jul. 28, 2017, 11 pages.
Ersue, Mehmet, "ETSI NFV Management and Orchestration—An Overview," Presentation at the IETF# 88 Meeting, Nov. 3, 2013, 14 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconsin, Madison, Jun. 20, 2016, 7 pages, https://www.usenix.org/system/files/conference/hotcloud16/hotcloud16_hendrickson.pdf.
Jiang, Yuanlong, et al., "Fault Management in Service Function Chaining," Network Working Group, China Telecom, Oct. 16, 2015, 13 pages.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

Alizadeh, Mohammad, et al., "CONGA: Distributed Congestion-Aware Load Balancing for Datacenters," SIGCOMM '14, Aug. 17-22, 2014, 12 pages.
Author Unknown, "IEEE Standard for the Functional Architecture of Next Generation Service Overlay Networks, IEEE Std. 1903-2011," IEEE, Piscataway, NJ, Oct. 7, 2011; 147 pages.
Author Unknown, "OpenNebula 4.6 User Guide," Jun. 12, 2014, opennebula.org, 87 pages.
Author Unknown, "Service-Aware Network Architecture Based on SDN, NFV, and Network Intelligence," 2014, 8 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Bremler-Barr, Anat, et al., "Deep Packet Inspection as a Service," CoNEXT '14, Dec. 2-5, 2014, pp. 271-282.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Farrel, A., et al., "A Path Computation Element (PCE)—Based Architecture," RFC 4655, Network Working Group, Aug. 2006, 40 pages.
Jiang, Y., et al., "An Architecture of Service Function Chaining," IETF Network Working Group Internet Draft, draft-jiang-sfc-arch-01.txt, Feb. 14, 2014; 12 pages.
Katsikas, Goergios P., et al., "Profiling and accelerating commodity NFV service chains with SCC," The Journal of Systems and Software, vol. 127, Jan. 2017, pp. 12-27.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Service Function Chaining: Creating a Service Plane via Network Service Headers," IEEE Computer Society, 2014, pp. 38-44.
Zhang, Ying, et al. "StEERING: A Software-Defined Networking for Inline Service Chaining," IEEE, 2013, IEEE, p. 10 pages.

* cited by examiner

HIGH-EFFICIENCY SERVICE CHAINING WITH AGENTLESS SERVICE NODES

RELATED APPLICATION

This application is a continuation of U.S. patent application Ser. No. 14/305,810 filed on Jun. 16, 2014, the contents of which is incorporated by reference in its entirety. Co-pending U.S. application Ser. No. 13/872,008, filed on Apr. 26, 2013, entitled "ARCHITECTURE FOR AGENTLESS SERVICE INSERTION," AND Co-pending U.S. application Ser. No. 14/020,649, filed on Sep. 6, 2013, entitled "DISTRIBUTED SERVICE CHAINING IN A NETWORK ENVIRONMENT" are also incorporated herein by reference.

TECHNICAL FIELD

This disclosure relates in general to the field of communications and, more particularly, to high-efficiency service chaining with agentless service nodes.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for distributed service chaining in a network environment is provided and includes receiving a packet belonging to a service chain in a distributed virtual switch (DVS) network environment, where the packet includes a network service header (NSH) indicating a service path identifier identifying the service chain and a location of the packet on the service chain, evaluating a service forwarding table to determine a next service node based on the service path identifier and the location, with a plurality of different forwarding tables distributed across the DVS at a corresponding plurality of virtual Ethernet Modules (VEMs) associated with respective service nodes in the service chain, and forwarding the packet to the next service node, with substantially all services in the service chain provided sequentially to the packet in a single service loop on a service overlay.

Example Embodiments

Figure 1:
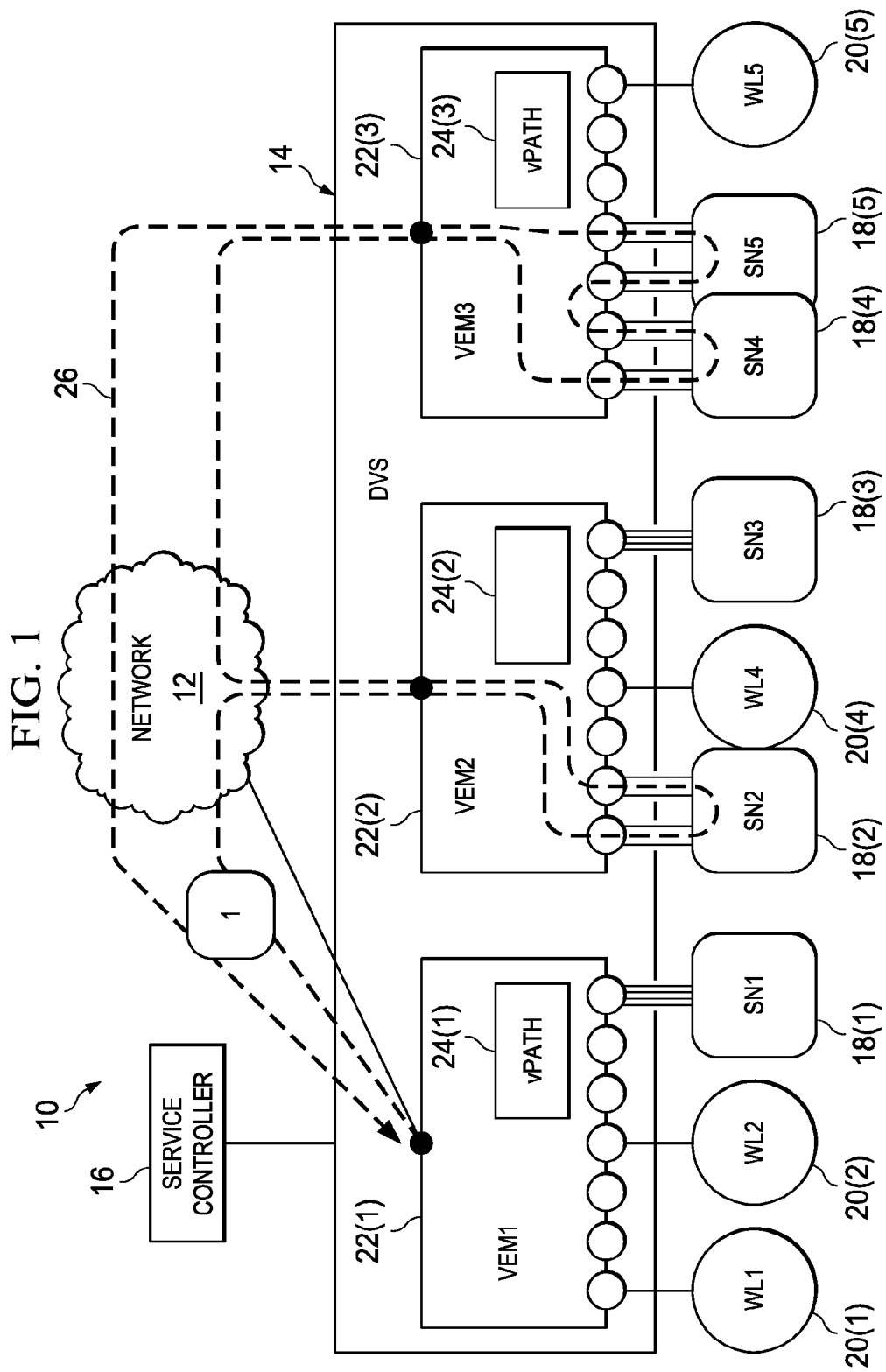
FIG. 1 is a block diagram illustrating a communication system for distributed service chaining in a network environment.

Turning to FIG. 1, FIG. 1 is a simplified block diagram illustrating a communication system 10 for distributed service chaining in a network environment in accordance with one example embodiment. FIG. 1 illustrates a network 12 (generally indicated by an arrow) comprising a distributed virtual switch (DVS) 14. DVS 14 can include a service controller 16. A plurality of service nodes (SN) 18 (e.g., SNs 18(1)-18(5)) may provide various network services to packets entering or leaving network 12. A plurality of virtual machines (VMs) may provide respective workloads (WLs) 20 (e.g., WL 20(1)-20(5)) on DVS 14, for example, by generating or receiving packets through DVS 14. One or more virtual Ethernet modules (VEMs) 22 (e.g., VEMs 22(1)-22(3)) may facilitate packet forwarding by DVS 14. In various embodiments, DVS 14 may execute in one or more hypervisors in one or more servers (or other computing and networking devices) in network 12. Each hypervisor may be embedded with one of VEMs 22 that can perform various data plane functions such as advanced networking and security, switching between directly attached virtual machines, and uplinking to the rest of the network. Each VEM 22(1)-22(3) may include respective vPaths 24(1)-24(3) that can redirect traffic to SNs 18 before DVS 14 sends the packets into WLs 20.

Note that although only a limited number of SNs 18, WLs 20, VEMs 22, and vPaths 24 are provided in the FIGURE for ease of illustration, any number of service nodes, workloads, VEMs and vPaths may be included in communication system 10 within the broad scope of the embodiments. Moreover, the service nodes and workloads may be distributed within network 12 in any suitable configuration, with various VEMs and vPaths to appropriately steer traffic through DVS 14.

Embodiments of communication system 10 can facilitate distributed service chaining in network 12. As used herein, the term "service chain" includes an ordered sequence of a plurality of services provided by one or more SNs (e.g., applications, virtual machines, network appliances, and other network elements that are configured to provide one or more network services) in the network. A "service" may include a feature that performs packet manipulations over and beyond conventional packet forwarding. Examples of services include encryption, decryption, intrusion management, firewall, load balancing, wide area network (WAN) bandwidth optimization, application acceleration, network based application recognition (NBAR), cloud services routing (CSR), virtual interfaces (VIPs), security gateway (SG), network analysis, etc. The service may be considered an optional function performed in a network that provides connectivity to a network user. The same service may be provided by one or more SNs within the network.

According to some embodiments, a user (e.g., system administrator) can configure the service chain and provision it directly at an applicable workload 20 (e.g., WL 20(1)). Service controller 16 may segment the user configured service chain in DVS 14. According to various embodiments, VEMs 22(1)-22(3) may generate headers for forwarding packets according to the configured service chain such that substantially all services in the service chain may be provided in a single service loop irrespective of the number of services, with respective VEMs 22(1)-22(3) making independent decisions (e.g., without referring to other VEMs or other network elements) about the next hop decisions in the service chain packet forwarding. As used herein, the term "service loop" refers to a path of the packet from a starting point (e.g., WL 20(1)) through various service nodes (e.g., SN 18(2), SN 18(4), SN 18(5)) of the service chain until termination at the starting point (e.g., WL 20(1)). The service chain traffic may be steered over network 12 in a service overlay 26. Note that it is not always necessary to terminate the starting point, so that this may not necessarily be a "loop." It is intended for "service loop" to encompass the operation in either case.

As used herein, the term "service controller" includes a process (e.g., instance of a computer program that is executing) that can provision services at one or more service nodes according to preconfigured settings. The preconfigured settings may be provided at the service controller by a user through an appropriate command line interface, graphical user interface, script, or other suitable means. The term "VEM" includes one or more network interfaces, at least some portions of switching hardware and associated firmware and software, and one or more processes managing the one or more network interfaces to facilitate packet switching in a switch, including a distributed virtual switch (e.g., DVS 14). VEMs may be named as service VEMs when they provide connectivity to service nodes; and as classifier VEMs when they provide connectivity to the workloads that function as the initial node in a service chain. In certain embodiments, one or more VEMs may be provided in an instance of a Cisco® unified computing system (UCS) rack server.

Service overlay 26 encompasses a level of indirection, or virtualization, allowing a packet (e.g., unit of data communicated in the network) destined to a specific workload to be diverted transparently (e.g., without intervention or knowledge of the workloads) to other service nodes as appropriate. Service overlay 26 includes a logical network built on top of existing network 12 (the underlay). Packets are encapsulated or tunneled to create the overlay network topology. For example, service overlay 26 can include a suitable header (called a network service header (NSH)), with corresponding source and destination addresses relevant to the service nodes in the service chain.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Service chaining involves steering traffic through multiple services in a specific order. The traffic may be steered through an overlay network, including an encapsulation of the packet to forward it to appropriate service nodes. The services in the chain are typically of two types: agentful services and agentless services. Agentful services host an embedded agent owned by a network infrastructure provider to abstract the underlying network details in inserting services. The embedded agent exposes application programming interfaces (APIs) to the services to enable interaction with the underlying (network) infrastructure for service insertion including communication of metadata to the services and utilizing advanced infrastructure capabilities (e.g., offloads). Agentless services integrate with the underlying infrastructure in their native forms through respective network interfaces. Although agentless services lose the ability to utilize advanced infrastructure capabilities, it eases integration of services. Given the benefits of either type of service, any service chaining architecture should desirably support both types of service in a service chain. The traffic steering mechanism executes either completely in the network infrastructure, or both in the network infrastructure and the agents (that execute in the respective service nodes).

Existing service insertion architectures (such as vPath) support both agentful and agentless services. However, typical service chaining includes either agentful services, or alternatively, agentless services; the service chains do not include both agentful and agentless services in the same service chain. In addition, the service chains are orchestrated in a centralized fashion in the network infrastructure. The centralized model of service chaining is termed hub-n-spoke or in-and-out: a network node (switch/router) intercepting and classifying the traffic (requiring services) acts as the hub, while the spokes extend from the central node to the services (e.g., via additional switches and routers on an overlay). Service chaining architecture in such schemes are geared primarily for agentful services. Further, some service chaining architectures require the services to participate in service forwarding through the embedded agent. A major drawback of the hub-n-spoke service chaining scheme is performance degradation due to the centralized nature of the architecture. Moreover, there does not exist a scheme that chains agentless and agentful services while maintaining the service forwarding solely in the network infrastructure.

Communication system 10 is configured to address these issues (and others) in offering a system and method for distributed service chaining in a network environment. Embodiments of communication system 10 may facilitate a distributed method of service chaining that chains both agentful and agentless services in the same service chain, without participation of services in service forwarding. Each VEM 22(1)-22(3) may serve as an originator of respective network service headers (NSHs) for service overlay 26. As used herein, the term "network service header" includes a data plane header (e.g., metadata) added to frames/packets. The NSH contains information required for service chaining, and metadata added and consumed by SNs 18 and WLs 20. (Examples of metadata include classification information used for policy enforcement and network context for forwarding post service delivery). According to embodiments of communication system 10, each NSH may include a service path identifier identifying the service chain to which a packet belongs, and a location of the packet on the service chain, which can indicate the service hop (NSH aware node to forward the packet) on service overlay 26. The service path identifier and the location of the packet can comprise any suitable text, number or combination thereof. In an example embodiment, the service path identifier is a 24 bit number, and the location may be specified by an 8 bit number.

According to various embodiments, a user may configure (e.g., provision, arrange, organize, construct, etc.) the service chains at service controller 16. Service controller 16 may discover location of service nodes 18(1)-18(5). In some embodiments, the service chain may be provisioned by service controller 16 in a port profile at respective vPaths 24(1)-24(3) associated with specific workloads 20 that instantiate the service chains, thereby binding the service policy including the service chain with the network policy included in the port profile. In other embodiments, when service chains are instantiated at classifier VEM 22(1), associated with the initiating workload 20(2), service controller 16 may be notified of the service chain instantiation. Service controller 16 may assign a path identifier to each instantiated service chain. Service controller 16 may populate service forwarding table entries indicating the next service hop for respective service chains identified by corresponding path identifiers. Service controller 16 may program service forwarding tables at appropriate VEMs 22 based on service node discovery information.

Merely for illustrative purposes, and not as a limitation, assume a service chain 1 provisioned at WL 20(2) as follows: WL2→SN2→SN4→SN5. In other words, a packet originating at WL 20(2) may be steered to SN 18(2), serviced accordingly, then to SN 18(4), then to SN 18(5), and finally returned to WL 20(2). VEM 22(1) may generate an NSH including the Internet Protocol (IP) or Media Access Control (MAC) address of VEM 22(1) at which WL 20(2) is located as a source address, and an IP/MAC address of SN 18(2) as the next service hop. Destination VEM 22(2), at which SN 18(2) is located may inspect the NSH and take suitable actions depending on whether SN 18(2) includes an agent (e.g., agentful) or does not include an agent (e.g., agentless). If SN 18(2) is agentless, VEM 22(2) may cache the information included in the NSH in a flow table. If SN 18(2) is agentful, the packet may be forwarded to the agent as appropriate.

According to various embodiments, after the packet is suitably serviced at SN 18(2), VEM 22(2) may intercept the packet and lookup the next service hop. The NSH may be updated to indicate the next service hop as SN 18(4) (rather than WL 20(2), for example). The packet may be forwarded on service overlay 26 to the next service hop, where VEM 22(3) may intercept the packet, and proceed appropriately.

Embodiments of communication system 10 may decentralize the service forwarding decisions, with each VEM 22 making appropriate next service hop decisions. Embodiments of communication system may facilitate termination or re-origination (as appropriate) of service overlay 26, with seamless integration of agentful and agentless services. Any kind of network (e.g., enterprise, service provider, etc.) may implement embodiments of communication system 10 as appropriate.

Further, the service forwarding decision at any of VEMs 22(1)-22(3) may be limited to the next-hop of the service chain, rather than all hops of the service chain. For example, the next service hop decision at the classifier VEM (e.g., VEM 22(1)) may determine the first SN (e.g., SN 18(2)) in the service chain and may send the traffic on service overlay 26 to the first SN (e.g., SN 18(2)). The NSH may be written to indicate the source as VEM 22(1) and next service hop as SN 18(2): <overlay: source=VEM1), destination=SN2>. The service VEM (e.g., VEM 22(2)) at SN 18(2) may simply allow the traffic on service overlay 26 to pass through to SN 18(2).

After the service is delivered at the SN (e.g., SN 18(2)), the SN (e.g., SN 18(2)) may simply send the serviced traffic back on service overlay 26 to where traffic came from (e.g., WL 20(2), or VEM 22(1)). For example, SN 18(2) may write the NSH to indicate the source as SN 18(2) and destination as VEM 22(1): <overlay: source=SN2, destination=VEM1>. The return traffic may be intercepted by the service VEM (e.g., VEM 22(2)) next (or closest) to the SN (e.g., SN 18(2)). The intercepting service VEM (e.g., VEM 22(2)) may make the service forwarding decision, determining the next SN (e.g., SN 18(4)) in the service chain and re-originating the NSH to the next SN (e.g., SN 18(4)). The NSH may be rewritten to indicate the source as VEM 22(2) and destination as SN 18(4): <overlay: source=VEM2, destination=SN4>.

The process of service forwarding can continue from VEMs 22 to SNs 18 until all SNs in the service chain deliver services. The forwarding decision may be based on the presence or absence of an agent at SN 18. For example, assume merely for example purposes and not as a limitation, that SN 18(4) is agentless, VEM 22(3) may notice that NSH indicates a destination of SN 18(4), which is agentless. VEM 22(3) may terminate service overlay 26 and perform translation to send the traffic to SN 18(4). After SN 18(4) delivers the service, it may simply send the original payload packet out, which may be received by VEM 22(3) for translation back onto service overlay 26. VEM 22(3) may intercept SN 18(4)'s traffic and determine the next service hop as SN 18(5) (which, for example purposes, may be agentful and on the same VEM as SN 18(4)). VEM 22(3) may re-originate NSH to SN 18(5): <overlay: source=VEM3, destination=SN5>. After the service is applied, SN 18(5) may simply re-originate the NSH back to VEM 22(3): <overlay: source=SN5, destination=VEM3>.

The service VEM (e.g., VEM 22(3)) intercepting the return traffic from the last SN (e.g., SN 18(5)) in the service chain may determine the end of service chain. If the last VEM (e.g., VEM 22(3)) is capable of forwarding the payload traffic, it may simply forward it on the underlay network (e.g., network 12). If on the other hand, the payload traffic can only be forwarded by classifier VEM (e.g., VEM 22(1)), the NSH may be re-originated by the last VEM (e.g., VEM 22(3)) back to the classifier VEM (e.g., VEM 22(1)). VEM 22(1) may receive the serviced packet on service overlay 26 and may determine that all services on the service chain are delivered. VEM 22(1) may forward the original payload packet, serviced by the service chain, natively or on the underlay network (e.g., network 12), as appropriate.

In some embodiments, for example, as in a service provider network environment that represents a non-homogeneous environment, the network infrastructure, including DVS 14 may be owned and operated by the provider; WLs 20 may belong to the tenants of the provider; and SNs 18 may be hosted by the provider on behalf of the tenant or hosted by the tenants themselves, or by other third parties. In some embodiments, for example, wherein the service provider hosts SNs 18 on behalf of the tenant, NSH of service overlay 26 may use the IP/MAC addresses of VEMs 22 and SNs 18 for source and destination addresses.

In some other embodiments, for example wherein the tenants host SNs 18, traffic over service overlay 26 may be forwarded in two hops: (1) provider overlay; and (2) tenant overlay. In provider overlay, origination and termination of service overlay 26 may be implemented within the network infrastructure, including DVS 14 (and associated VEMs 22). Hence, the end points of the provider overlay may comprise VEMs 22. For example, turning to the example of service chain 1, one of the provider overlay hops may stretch from VEM 22(1) to VEM 22(2): <overlay: source=VEM1, destination=VEM2>. In tenant overlay, the origination may occur in the network infrastructure and the termination may be a local destination. Continuing the example of service chain 1, one of the tenant overlay hops may stretch from VEM 22(2) to SN 18(2): <overlay: source=VEM2, destination=SN2>. The tenant overlay source address can be local to respective VEMs 22 (e.g., VEM 22(2)), allowing for overcoming the tenant and provider address domain packet forwarding issues across the service provider network.

Embodiments of communication system 10 can provide a method to decentralize the service forwarding decisions across the network infrastructure, enabling overlays to be re-originated within the network infrastructure while allowing the agentful service nodes to be agnostic to service chaining. Embodiments of communication system 10 can enable service chains that can have agentful as well as agentless services as part of the same service chain. Embodiments of communication system 10 can also provide a method for maintaining the provider and tenant address space separation while allowing the service chains to cross the provider-tenant network boundary.

According to various embodiments of communication system 10, service chains can be realized in a distributed fashion across the network infrastructure without a centralized bottleneck while keeping the agentful services agnostic to service forwarding decisions. Service chains may contain both agentful and agentless services while being agnostic to service forwarding decisions. Service chaining performance may stay constant and may not degrade with the number of services in the service chain. Service chains may involve services that are hosted by either the provider or the tenant without departing from the scope of the embodiments, providing a 'clean' service chaining implementation in both enterprise and service provider environments (among other network environments).

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, services nodes 18(1)-18(5) represent a specific functionality (e.g., provision of a specific service) and may be embodied in one or more physical appliances. For example, some services nodes (e.g., service nodes 18(4) and 18(5)) may be provided in a common network element, whereas some other service nodes (e.g., 18(1) and 18(2)) may be stand-alone network elements that are configured to exclusively provide the respective specific service. Note that although only five service nodes 18(1)-18(5) are illustrated in FIG. 1, any number of service nodes and corresponding services may be provided within the broad scope of the embodiments.

In various embodiments, workload 20 may be separate computing devices running applications (e.g., server/client applications in client-server network architecture). In other embodiments, workload 20 may be separate virtual machines on the same or different computing devices (e.g., server blades in a data center). In some embodiments, workload 20 may include server blades configured in one or more chassis. DVS 14 may include physical and virtual switches and can include any suitable network element capable of receiving packets, and forwarding packets appropriately in a network environment. Any number of workload may be active within network 12 within the broad scope of the embodiments.

VEMs 20 can include virtual interfaces (e.g., virtual equivalent of physical network access ports) that maintain network configuration attributes, security, and statistics across mobility events, and may be dynamically provisioned within virtualized networks based on network policies stored in DVS 14 as a result of VM provisioning operations by a hypervisor management layer. VEMs 22 may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with DPs 24(2)-24(6), transparent mobility of VMs across different physical servers and different physical access-layer switches within an enterprise network may be possible. vPaths 24(1)-24(3) may provide intelligent traffic steering (e.g., flow classification and redirection), and fast path offload for policy enforcement of flows. vPaths 24(1)-24(3) may be configured for multi-tenancy, providing traffic steering and fast path offload on a per-tenant basis. Although only three vPaths 24(1)-24(3) are illustrated in FIG. 1, any number of vPaths may be provided within the broad scope of the embodiments of communication system 10.

In one example embodiment, service controller 16 may be an application coupled with a management module (e.g., virtual supervisor module (VSM)) of DVS 14. In another embodiment, service controller 16 may be a stand-alone application (e.g., provisioned in a suitable network element) separate and distinct from DVS 14 and communicating therewith through appropriate communication links. In some embodiments, service controller 16 may be provisioned in the same local area network as workload 20. In other embodiments, service controller 16 may be provisioned in a different local area network separate and remote from workload 20. Service controller 16 may include a graphical user interface (GUI) based controller, or a CLI based controller, or a combination thereof.

Figure 2:
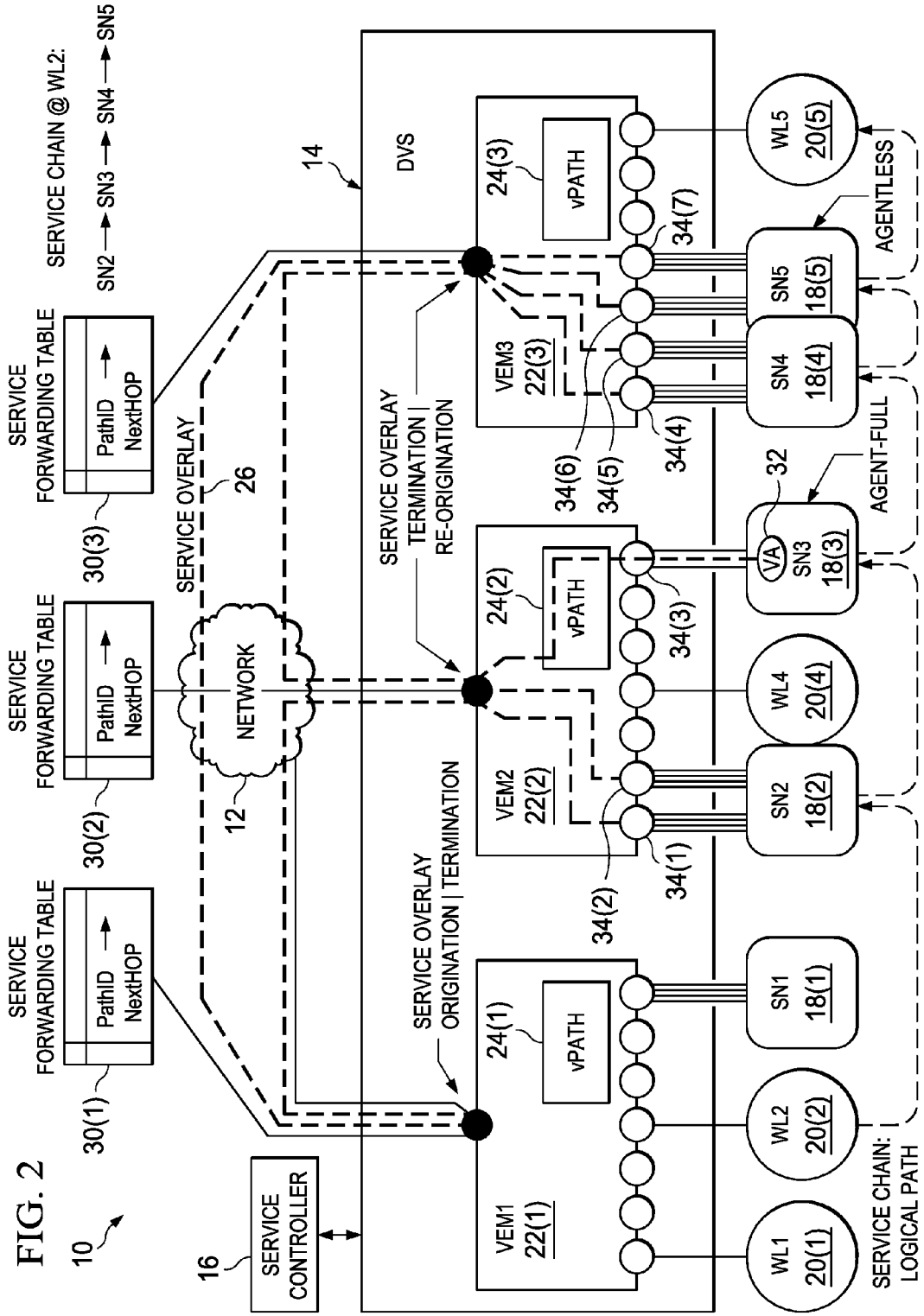
FIG. 2 is a block diagram illustrating example details of an embodiment of the communication system.

Turning to FIG. 2, FIG. 2 is a simplified block diagram illustrating example details that may be associated with an embodiment of communication system 10. An example service chain is illustrated in the figure, starting at WL 20(2), proceeding to SN 18(2), then to SN 18(3), then to SN 18(4), then to SN 18(5), and lastly, to WL 20(5): WL2→SN2→SN3→SN4→SN5→WL5. Service controller 16 may program service forwarding tables 30(1)-30(3) at respective VEMs 22(1)-22(3). Each service forwarding table 30(1)-30(3) may include a path identifier (ID) and a next service hop information. Some SNs 18 may include an agent 32. For example, SN 18(3) may include agent 32. Note that the configuration described herein is merely for example purposes, and is not intended to be a limitation of embodiments of communication system 10.

The packet from WL 20(2) may be encapsulated with the NSH at classifier VEM 22(1) based on information in service forwarding table 30(1). The packet may be forwarded on service overlay 26 to the next service hop, namely SN 18(2). VEM 22(2) may decapsulate the NSH, and forward the packet through interface 34(1) to SN 18(2), which may be agentless. SN 18(2) may service the packet, and rewrite the packet header to indicate the destination address of VEM 22(1) and send the packet out through interface 34(2). VEM 22(2) may intercept the packet, and re-originate the NSH based on information in service forwarding table 30(2). The destination is written to be the IP/MAC address of SN 18(3). VEM 22(2) may forward the packet to SN 18(3) transparently (e.g., without decapsulation of the NSH) via interface 34(3) as SN 18(3) includes agent 32. After being serviced, the packet may be returned to VEM 22(2) via interface 34(3). VEM 22(2) may intercept the packet, and re-originate the NSH based on information in service forwarding table 30(2). The destination may be written to be the IP/MAC address of SN 18(4) and the packet forwarded to VEM 22(3) on service overlay 26.

VEM 22(3) may decapsulate the packet, and forward the packet to SN 18(4) over interface 34(4). SN 18(4) may service the packet appropriately, and attempt to return it to VEM 22(1) over interface 34(5). VEM 22(3) may intercept the packet, and re-originate the NSH based on information in service forwarding table 30(3). The destination may be written to be the IP/MAC address of SN 18(5) and the packet forwarded to SN 18(5) over interface 34(6). SN 18(5) may service the packet appropriately, and attempt to return it to VEM 22(1) over interface 34(7). VEM 22(3) may intercept the packet, and re-originate the NSH based on information in service forwarding table 30(3). In some embodiments, the destination may be written to be the IP/MAC address of WL 20(5) and the packet forwarded to WL 20(5) over network 12, or the appropriate interface. In other embodiments, the destination may be written to be the IP/MAC address of classifier VEM 22(1) and the packet forwarded to WL 20(2) on service overlay 26 as appropriate.

Figure 3:
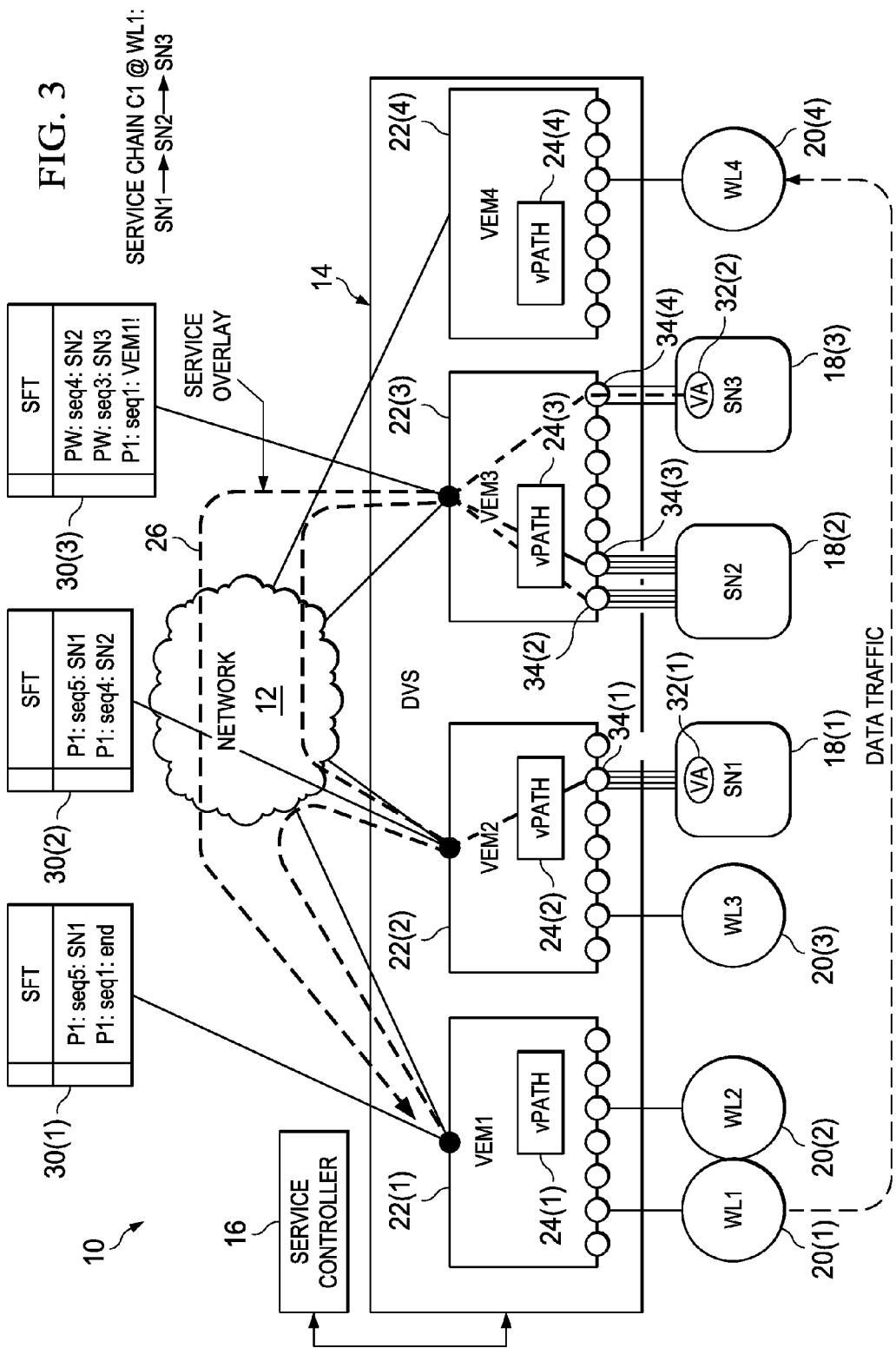
FIG. 3 is a block diagram illustrating other example details of an embodiment of the communication system.

Turning to FIG. 3, FIG. 3 is a simplified block diagram illustrating example details that may be associated with an embodiment of communication system 10. Data traffic may be communicated on underlay network 12, and service traffic (e.g., packets subject to being serviced at various SNs 18) may be communicated on service overlay 26. An example data traffic path may comprise communication between WL 20(1) and WL 20(4), and the service traffic path may comprise communication from WL 20(1) to SN 18(1), to SN 18(2), to SN 18(3), and back to WL 20(1): WL1→SN1→SN2→SN3→WL1. Assume, merely for example purposes and not as a limitation that SN 18(1) and SN 18(3) are agentful, including respective agents 32(1) and 32(2), and SN 18(2) is agentless.

Service controller 16 may configure multiple paths (e.g., a forward path and a return path) on each service forwarding table 30(1)-30(3). Each path may indicate the service path identifier that indicates (e.g., identifies) the specific service chain, a location on the service chain, indicated by a service index, and a next service node on the service chain. For example, at service forwarding table 30(1) on VEM 22(1), a first path may be configured as P1: seq5: SN1, indicating service chain identified by service path identifier P1, with a service index seq5 corresponding to the location of the packet on service chain P1, and a next service node of SN 18(1) (e.g., when the packet arrives at VEM 22(1) on service chain P1 with service index seq5, send it to SN 18(1)). A second path at service forwarding table 30(1) on VEM 22(1) may be configured as P1: seq1: end, indicating the service chain identified by service path identifier P1, with a service index seq1 corresponding to the end of the return service traffic path at VEM 22(1) (e.g., when the packet arrives at VEM 22(1) on service chain P1 with service index seq1, end the service path).

At service forwarding table 30(2) on VEM 22(2), the first path may be configured as P1: seq5: SN1, indicating the service chain identified by service path identifier P1, with a service index seq5 corresponding to the location seq5 of the packet on the service chain and next service node of SN 18(1) (e.g., when the packet arrives at VEM 22(2) on service chain P1 with service index seq5, send it to SN 18(1)). The second path at service forwarding table 30(2) on VEM 22(2) may be configured as P1: seq4: SN2, indicating the service chain identified by service path identifier P1, with a service index seq4 corresponding to the location seq4 of the packet on the service chain and the next service node of SN 18(2)

(e.g., when the packet arrives at VEM 22(2) on service chain P1 with service index seq4, send it to SN 18(2)).

At service forwarding table 30(3) on VEM 22(3), the first path may be configured as P1: seq4: SN2, indicating the service chain identified by service path identifier P1, with a service index seq4 corresponding to the location seq4 of the packet on the service chain and the next service node of SN 18(2) (e.g., when the packet arrives at VEM 22(3) on service chain P1 with service index seq4, send it to SN 18(2)). The second path at service forwarding table 30(3) on VEM 22(3) may be configured as P1: seq3: SN3, indicating the service chain identified by service path identifier P1, with a service index seq3 corresponding to the location seq3 of the packet on the service chain and the next service node of SN 18(3) (e.g., when the packet arrives at VEM 22(3) on service chain P1 with service index seq3, send it to SN 18(3)). The third path at service forwarding table 30(3) on VEM 22(3) may be configured as P1: seq1: VEM1, indicating the service chain identified by service path identifier P1, with a service index seq1 corresponding to the location seq1 of the packet on the service chain and the next service node of VEM 22(1) (e.g., when the packet arrives at VEM 22(3) on path P1 with service index seq1, send it to VEM 22(1)).

Figure 4:
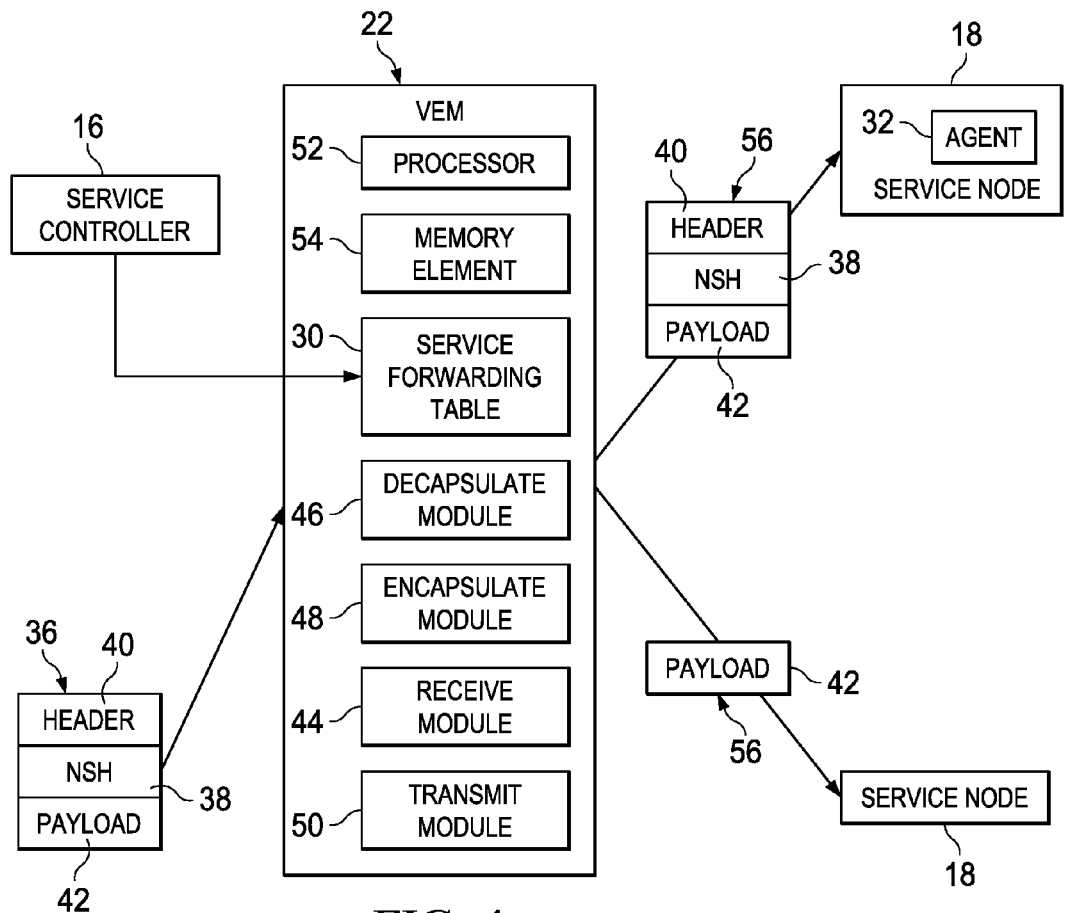
FIG. 4 is a block diagram illustrating yet other example details of an embodiment of the communication system.

Turning to FIG. 4, FIG. 4 is a simplified block diagram illustrating details of an example VEM 22 according to an embodiment of communication system 10. An incoming packet 36 may include NSH 38, a transport header 40, and a payload 42. A receive module 44 at VEM 22 may receive packet 36. A decapsulate module 46 may decapsulate the transport header 40 and NSH 38 and inspect the contents thereof. An encapsulate module 48 may lookup service forwarding table 30 and determine the next service hop to send packet 36. Service forwarding table 30 may be programmed by service controller 16 with appropriate entries.

If packet 36 is to be sent to an agentful service node 18, for example, which includes agent 32, encapsulate module 50 may encapsulate packet 36 with another NSH 38, and retain transport header 40 and payload 42 to generate outgoing packet 56. If packet 36 is to be sent to an agentless service node 18, encapsulate module 50 may remove transport header 40 and generate outgoing packet 56 without NSH 38. A transmit module 50 may transmit outgoing packet 56 to appropriate SN 18. A processor 52 and a memory element 54 may facilitate the operations described herein.

Figure 5:
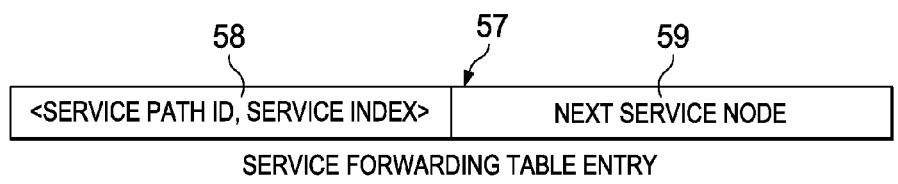
FIG. 5 is a block diagram illustrating yet other example details of an embodiment of the communication system.

Turning to FIG. 5, FIG. 5 is a simplified block diagram illustrating an example service forwarding table entry 57 according to an embodiment of communication system 10. Example service forwarding table entry 57 may include a field 58 comprising the service path ID and a service index. Field 59 may include the next service node on the path identified by the service path ID and the service index of field 58.

Figure 6:
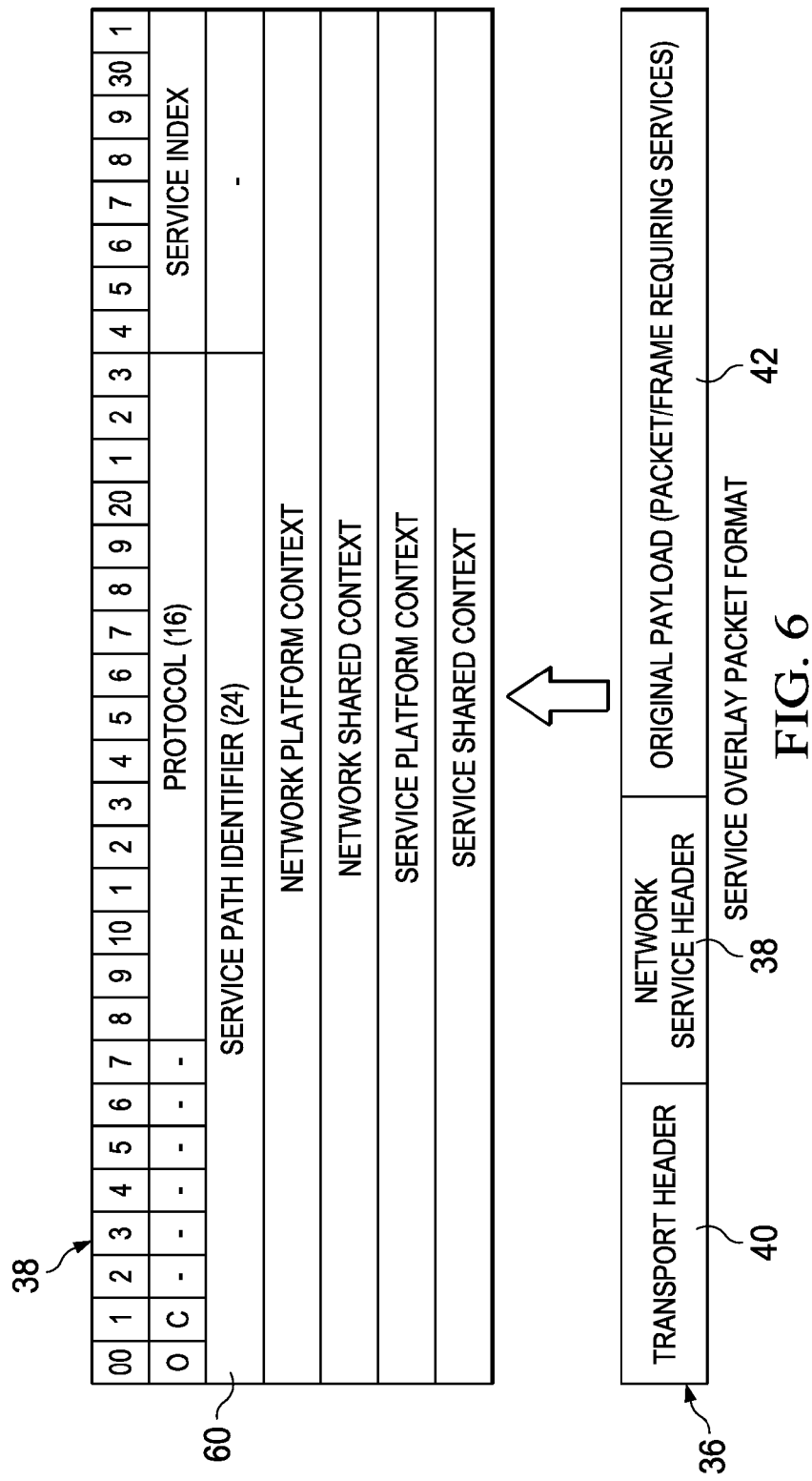
FIG. 6 is a block diagram illustrating yet other example details of an embodiment of the communication system.

Turning to FIG. 6, FIG. 6 is a simplified block diagram illustrating an example service overlay packet format according to an embodiment of communication system 10. Example service overlay packet format may include NSH 38, transport header 40 and payload 42. NSH 38 may comprise four 32-bit context headers (e.g., service shared context, service platform context, network shared context, and network platform context), and an additional header 60 comprising the 24 bit service path identifier and 8 bit service index.

Figure 7:
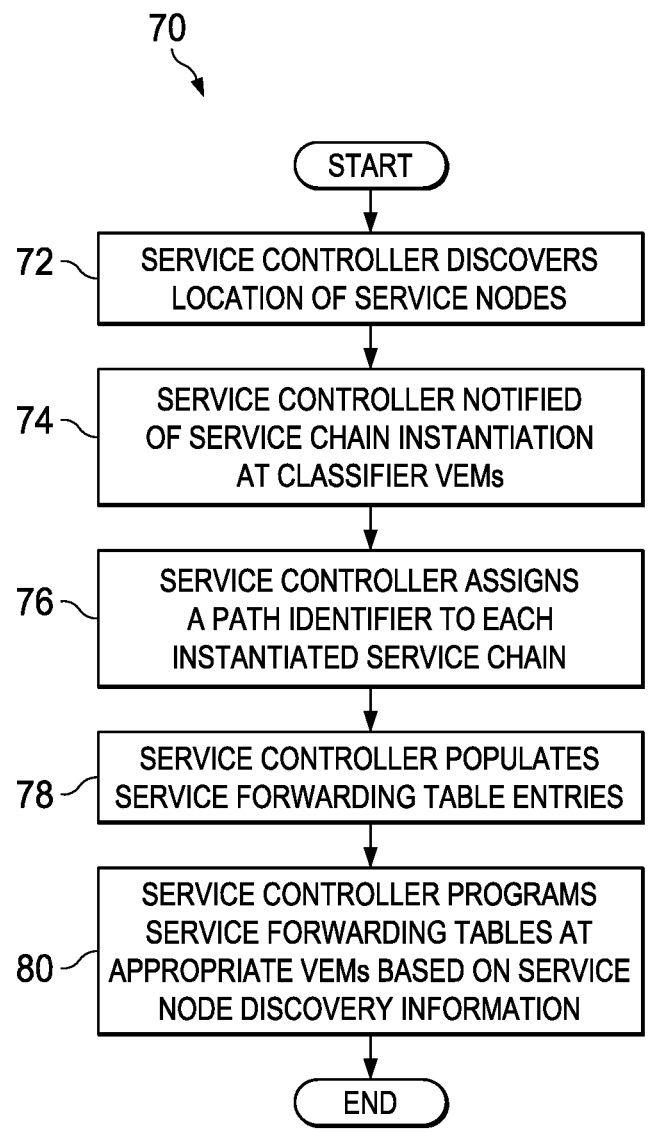
FIG. 7 is a flow diagram illustrating example operations that may be associated with an embodiment of the communication system.

Turning to FIG. 7, FIG. 7 is a simplified flow diagram illustrating example operations 70 that may be associated with an embodiment of communication system 10. At 72, service controller 16 may discover locations of service nodes 18 in DVS 14. At 74, when service chains are instantiated at classifier VEMs 22 (e.g., at WLs 20), service controller 16 may be notified of the service chain instantiation. At 76, service controller 16 may assign respective path identifiers to each service chain. At 78, service controller 16 may populate service forwarding tables 30 with appropriate entries. At 80, service controller 16 may program (e.g., install, implement, execute, etc.) service forwarding tables 30 at respective VEMs 22 based on service node discovery information.

Figure 8:
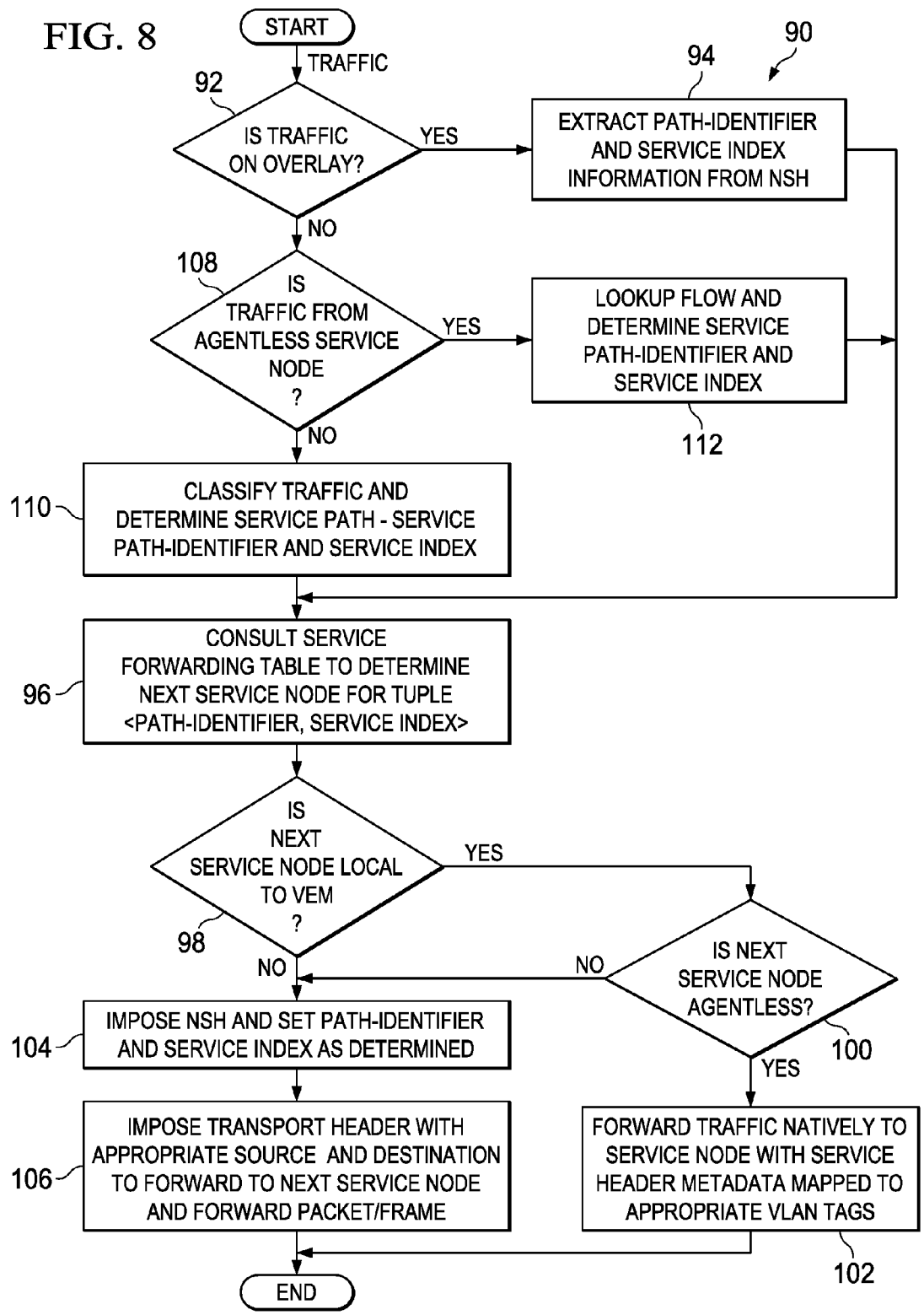
FIG. 8 is a flow diagram illustrating other example operations that may be associated with an embodiment of the communication system.

Turning to FIG. 8, FIG. 8 is a simplified flow diagram illustrating example operations 90 that may be associated with an embodiment of communication system 10. At 92, a determination may be made at VEM 22 whether incoming traffic is on service overlay 26 (for example, the determination may be informed by the presence or absence of NSH 38). If traffic is on service overlay 26, at 92, the path identifier and service index information may be obtained from NSH 38. At 96, service forwarding table 30 may be consulted to determine next service node 18 or tuple <path-identifier, service index>. At 98, a determination may be made whether next service node 18 is local to VEM 22. If next service node 18 is local to VEM 22, a determination may be made at 100 whether service node 18 is agentless. If service node 18 is agentless, at 102, traffic may be forwarded natively (e.g., without NSH 38) with service header metadata mapped to appropriate VLAN tags. If service node 18 is agentful, at 104, another NSH 38 may be imposed with appropriate path identifier and service index as determined from service forwarding table 30. At 106, transport header 40 with appropriate source and destination may be imposed to forward packet to next service node 18 and the packet/frame may be appropriately forwarded. Turning back to 98, if next service node 18 is not local to VEM 22, the operations may step to 104, and continue thereafter.

Turning back to 92, if the traffic is not on overlay 92, a determination may be made at 108 whether the traffic is from an agentless service node. If not, indicating that the traffic is from WL 20, at 110, the traffic may be appropriately classified and the service path may be determined (e.g., service path identifier and service index identified). The operations may step to 96 and continue thereafter. On the other hand, at 92, if the traffic is from an agentless service node, at 112, the flow may be looked up in appropriate tables and the service path identifier and service index may be determined. The operations may step to 96, and continue thereafter.

Figure 9:
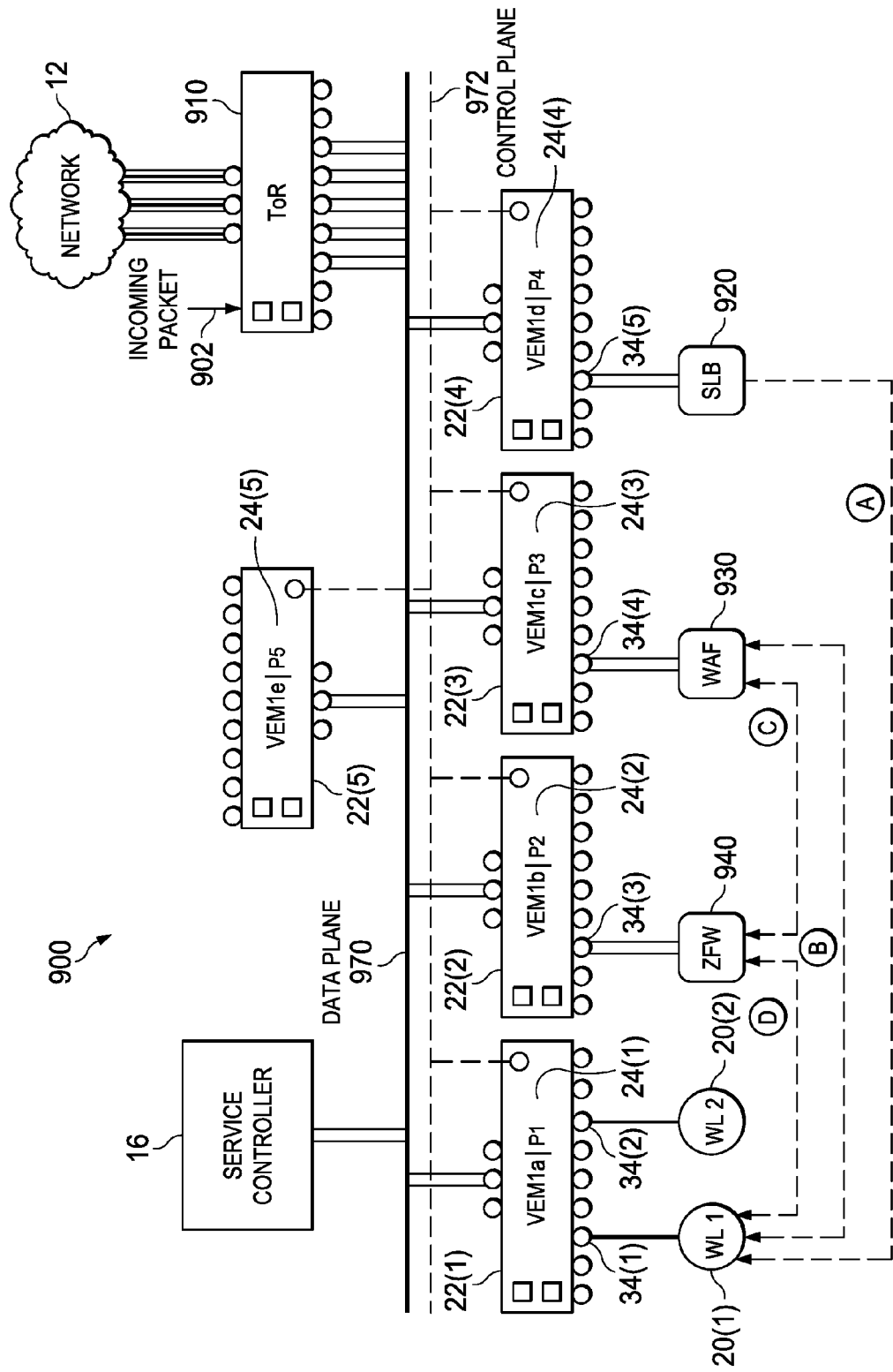
FIG. 9 is a block diagram illustrating yet other example details of an embodiment of the communication system.
Figure 10:
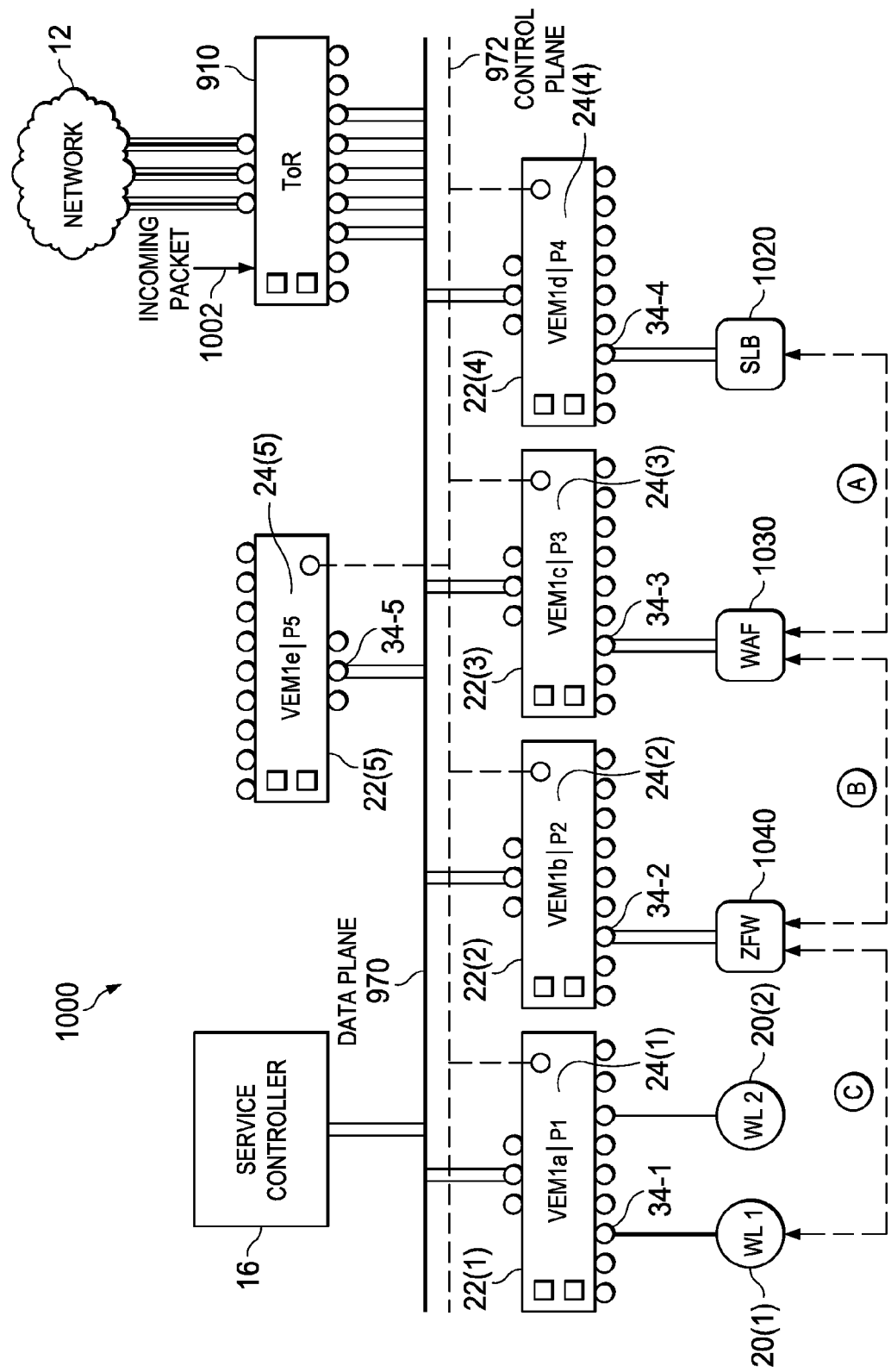
FIG. 10 is a block diagram illustrating yet other example details of an embodiment of the communication system.

FIGS. 9 and 10 are a network diagram of a modified communication system 900 in which agentless SNs may optionally be configured for high-efficiency service chaining. Specifically, in FIG. 9, agentless SNs 920, 930, and 940 are not configured for high-efficiency service chaining. In FIG. 10, agentless SNs 1020, 1030, and 1040 are configured for high-efficiency service chaining according to one or more examples of the present Specification.

The examples of FIGS. 9 and 10 are illustrated in terms of an incoming packet 902 and 1002, respectively, by way of non-limiting example. It will be readily apparent that identical methods may be applied to outgoing packets, as discussed in previous examples, to similarly realize high-efficiency service chaining. It will also be readily apparent that the specific SNs described and the specific service chain are provided only as an illustration of an example method to aid readers in more easily understanding the disclosed methods.

Communication system 900 includes a plurality of VEMs 22, labeled VEM 22(1)-22(5). Each VEM 22 includes a respective vPath 24, labeled vPaths 24(1)-24(5). For ease of reference, vPaths 24(1)-24(5) are abbreviated as P1-P5 respectively. Each VEM 22 may include one or more interfaces 34. To facilitate discussion, both a data plane 970 and a control plane 972 are explicitly shown. Communication system 900 is controlled by a service controller 16.

By way of example, VEM1a 22(1) has a plurality of virtual interfaces 34. A workload server WL1 20(1) is coupled to virtual interface 34(1), while a second workload server WL2 20(2) is coupled to interface 34(2). VEM1b 22(2) is communicatively coupled to a zone firewall (ZFW) 940 via virtual interface 34(3). VEM1c 22(3) is communicatively coupled to a web application firewall (WAF) via virtual interface 34(4). VEM1d is communicatively coupled to a server load balancer (SLB) 920 via virtual interface 34(5). By way of example, ZFW 940 and WAF 1030 may be treated as "out-of-path" services, meaning that they are invisible to incoming and outgoing packets, or stated differently, packets are not expressly directed to them. Rather, packets encounter these SNs only because these SNs are part of an SC that the packet is required to pass through before being forwarded to its ultimate destination. Out-of-path devices may include, for example, data packet inspection (DPI), network analysis modules (NAM), and proxies by way of non-limiting example. In contrast, SLB 920 may be "in-path," because traffic may be specifically directed to it. For example, when an end user requests a service provided by WL1 20(1), the request is directed to an IP address owned by SLB 920. SLB 920 may then contain logic to determine whether to direct the packet to WL1 20(1) or WL2 20(2).

In an embodiment, incoming packet 902 arrives at communication system 900 via network 12 and top-of-the-rack (ToR) switch 910. Incoming packet 902 first arrives at P4 on VEM1d 22(4), which in an example sits at the edge of communication system 900. VEM 22(4) forwards incoming packet 902 to SLB 920 via interface 34(5), natively by way of packet forwarding. SLB 920 is an agentless node in this example. SLB 920 examines incoming packet 902, and determines for example that incoming packet 902 should be delivered to WL1 20(1). Because SLB 920 is agentless, it is not aware of a service chain that should be applied to incoming packet 902, and so simply modifies the incoming packet 902 for delivery to WL1 20(1), and forwards the packet to VEM1d 22(4). The modification may involve changing the layer-2 and layer3 headers (or MAC and IP headers) due to Network Address Translation (or NAT) performed on the source IP address or the destination IP address or both. VEM1d 22(4) simply forwards the transformed incoming packet 902 towards WL1 20(1) which passes through VEM1a 22(1). The packet is not associated with any service chain at this point.

At interface 34(1), VEM1a 22(1), more specifically, vPath P1 on VEM1a, may classify the incoming packet 902 to determine that incoming packet 902 is subject to service chain "SC1," which in this example includes the sequence SLB→WAF→ZFW. Thus, before delivering incoming packet 902 to WL1 20(1), VEM1a 22(1) first applies service chain SC1. Incoming packet 902 has already been serviced by SLB 920, so vPath P1 of VEM1a 22(1) determines WAF 930 as the next hop and sends incoming packet 902 over to vPath P3 of VEM1c 22(3) after encapsulating it in NSH.

As before, VEM1c 22(3) decapsulates incoming packet 902 and based on the service chain in NSH delivers it to the next service node—agentless WAF 930. WAF 930 is not aware of the service chain. WAF 930 applies web application firewall rules to incoming packet 902 and delivers it back to interface 34(4). vPath P3 24(3) of VEM1c 22(3) intercepts the serviced packet 902 coming on interface 34(4) and determines the service chain the packet belongs to based on the cached information in vPath P3. vPath P3 determines the next hop for the packet from the service chain as VEM1b 22(2). vPath P3 re-originates the NSH and sends incoming packet 902 to P2 of VEM1b 22(2).

vPath P2 of VEM1b 22(2) decapsulates incoming packet 902 and based on the service chain in NSH delivers it to next service node—agentless ZFW 940 via interface 34(3). Agentless ZFW 940 is not aware of the service chain. ZFW 940 applies zone firewall rules to incoming packet 902 and returns it to interface 34(3). vPath P2 of VEM1b determines the service chain for packet 902 and from that it determines the next hop as vPath P1 of VEM1a. vPath P2 of VEM1b 22(2) re-originates the NSH and then sends incoming packet 902 to vPath P1 of VEM1a 22(1).

Finally, vPath P1 of VEM1a 22(1) decapsulates incoming packet 902, determines the service chain has ended and delivers the packet 902 to WL1 20(1) via interface 34(1). WL1 then acts on incoming packet 902.

Summarizing the path taken by incoming packet 902, it is apparent that service chain SC1 results in the packet path SLB→P4→P1→P3→WAF→P3→P2→ZFW→P2→P1→WL1. Tracing only the vPaths taken by incoming packet 902, it is found that the packet path includes P4→P1→P3→P2→P1.

In FIG. 10, it is seen that a more desirable packet path is SLB→P4→P3→WAF→P3→P2→ZFW→P2→P1→WL1, or reducing the service chain to bare paths, P4→P3→P2→P1. Thus, at least one extraneous hop is saved, which may result in decreased latency, network congestion and increased throughput. It is further recognized that other network configurations may result in even more wasted hops. For example, if SLB 920 and WAF 1030 were both hosted on VEM1c 22(3), incoming packet 1002 would "bounce" back and forth between P1 and P3 to receive the full service chain.

However, because SLB 920, WAF 930, and ZFW 940 are agentless, they are not aware of service chain SC1, and they cannot convey the service chain to VEM1d 22(4). When traffic is received by VEM1d from SLB 920, VEM1d therefore has no way to know the service chain the packet belongs to and that delivering incoming packet 1002 to WAF 930 rather than WL1 20(1) would be more efficient. The service chain the packet 902 belongs to is known only when that packet reaches the VEM1a 22(1).

To overcome this difficulty, modified communication system 1000 includes, by way of non-limiting example, additional mapping of local identifiers to specific service chains. In one example, these local identifiers are virtual local area networks (VLANs). For example, given example service chains SC1, SC2, and SC3, the service chains may be mapped to example VLANs 10, 11, and 12 respectively. Such a mapping is configured on the VEM connecting to the agentless service nodes such as SLB 1020 by the service controller 16. Thus, although SLB 1020 remains agnostic of service chains SC1, SC2, and SC3, it may still be enabled to follow the service chains' servicing order by directing packets to appropriate VLANs.

Thus, in an embodiment, incoming packet 1002 arrives at communication system 1000 via network 12 and ToR switch 910. Incoming packet 1002 first arrives at VEM1d 22(4), which in an example sits at the edge of communication system 900. VEM1d forwards incoming packet 1002 to SLB 1020 via interface 34(5) and vPath P4 is not involved in this forwarding process. SLB 1020 is an agentless node in this example, but has been configured with a VLAN v for traffic destined to workload pool containing workloads WL1 20(1)

and WL2 20(2). Note that VEMs may have many VLANs. SLB 1020 may simply choose one VLAN to forward the packet on, which in this case is designated as VLAN v. When the packet arrives on a certain VLAN at VEM1*d*, P4 maps that VLAN to a service chain. Such mapping must be provided through control plane provisioning.

SLB 1020 examines incoming packet 1002, and determines for example that incoming packet 1002 should be delivered to WL1 20(1) via VLAN v. Because SLB 1020 is agentless, it is not aware of a service chain that should be applied to incoming packet 1002, and so simply forwards packet 1002 to WL1 20(1) on VLAN v. VEM1*d* 22(4) receives this packet on interface 34(4) on VLAN v. VEM1*d* may then classify the incoming packet 1002 to determine that incoming packet 1002 is subject to service chain "SC1," which in this example includes the sequence SLB→WAF→ZFW. vPath P4 of VEM1*d* 22(4) then originates the NSH on incoming packet 1002 as described herein, and sends incoming packet 1002 through P4 to P3 of VEM1*c* 22(3), which is the next hop on service chain SC1.

vPath P3 of VEM1*c* 22(3) decapsulates incoming packet 1002 and based on the service chain in NSH, delivers it to agentless WAF 1030. WAF 1030 is not aware of the service chain. WAF 1030 applies web application firewall rules to incoming packet 1002 and delivers it back to interface 34(4) for forwarding. vPath P3 of VEM1*c* 22(3) re-originates the NSH and sends incoming packet 1002 via path P3 to P2 of VEM1*b* 22(2), which is the next hop on service chain SC1.

vPath P2 of VEM1*b* 22(2) decapsulates incoming packet 1002 and based on the service chain in NSH, delivers it to agentless ZFW 940 via interface 34(3). Agentless ZFW 940 is not aware of the service. ZFW 940 applies zone firewall rules to incoming packet 1002 and returns it to interface 34(3) for forwarding. vPath P2 of VEM1*b* 22(2) re-originates the NSH and then sends incoming packet 1002 via path P2 to path P1 of VEM1*a* 22(1), which is the next hop on service chain SC1.

Finally, VEM1*a* 22(1) decapsulates incoming packet 1002, determines that the service chain SC1 has ended based on the service index in NSH and delivers it to WL1 20(1) via interface 34(1). WL1 then acts on incoming packet 1002.

In the case of FIG. 10, incoming packet 1002 has taken a reduced or simplified path of SLB→P4→P3→WAF→P3→P2→ZFW→P2→P1→WL1, or reducing the service chain to bare paths, P4→P3→P2→P1.

By way of further elaboration of communication system 900 of FIG. 9 compared to communication system 1000 of FIG. 10, vPath service chaining architecture may integrate nodes in either agentful or agentless modes. In agentful mode, a vPath agent is embedded in the service node, which enables reception and transmission of service path and metadata in-band with traffic (packets) being serviced. This is achieved via the vPath service overlay network.

However, FIGS. 9 and 10 disclose embodiments of agentless service nodes. In agentless mode, because there is no vPath agent, packets are sent and received in their native form with no service path and metadata information associated with the packets. This is achieved on the underlay network.

Thus, vPath steers traffic to agentless out-of-path SNs and ensures the service path and metadata information are preserved so they can be associated with the traffic when the native traffic servicing is complete. However, agentless service nodes that are in-path (such as SLBs 920 and 1020, edge firewalls, and so forth) do not need vPath to steer traffic to them. Rather, they attract traffic naturally by virtue of their functions. These service nodes may also have extensive internal classification capability that classifies traffic and performs various actions on the selected traffic.

Since these service nodes are agentless they cannot communicate service path information to the vPath infrastructure. So when traffic exits SLB 920 or 1020, for instance, vPath has to reclassify to determine the service paths in order to put the traffic on the right service chain. It is difficult, at the infrastructure level, to replicate the classification performed in a service nodes (the vendors of these two may be different). Even if the classification can be replicated, it may be wasteful. So vPath may instead determine service chains at the workloads. As seen in FIG. 9, this may result in traffic being steered along a non-optimal path. However, when traffic is assigned a local identifier (such as a VLAN) that corresponds to the service chain, SLB 1020 can natively direct traffic along the service chain despite being agentless.

Thus, comparing communication system 900 to communication system 1000, in communication system 900 the service chain is applied at interface 34(1), after incoming packet 902 has already traversed interface 34(5), SLB 920, vPath P4, and vPath P1. In contrast, in communication system 1000, the service chain is effectively applied at interface 34(5) by mapping it to a local identifier such as a VLAN.

Figure 11:
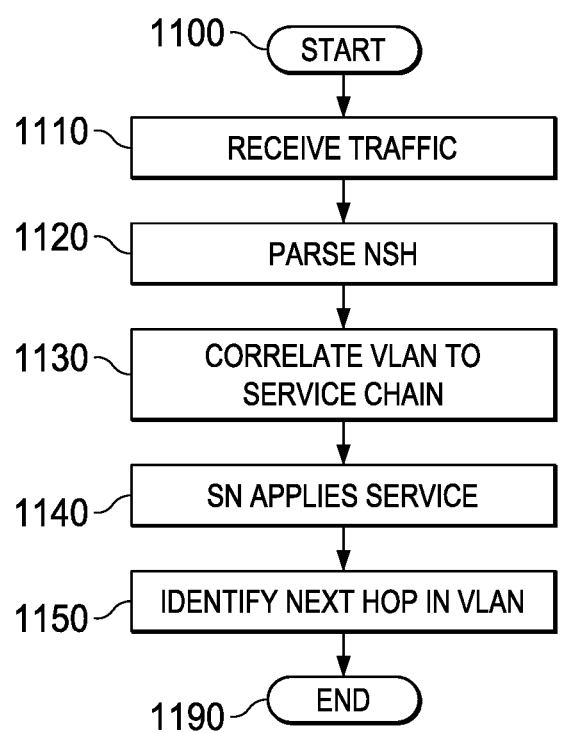
FIG. 11 is a flow diagram illustrating yet other example details of an embodiment of the communication system.

FIG. 11 is a flow chart of a method 1100 performed by a VEM 22 providing high-efficiency service chaining, for example at an edge node. For purposes of discussion, VEM 22(4) of FIG. 10 is used as an example.

In block 1110, VEM 22 receives traffic, such as packet 1002 of FIG. 10.

In block 1130, VEM 22 correlates an appropriate VLAN to the service chain. This may be a one-to-one mapping of a specific VLAN to each individual service chain, performed by a network administrator in advance, or it may include identifying a VLAN with a closest-available path if one-to-one mapping is not appropriate. Such "fuzzy" mapping mat be appropriate in certain embodiments because even if certain VEMs 22 receive packet 1002 extraneously, they will simply forward the packet to the next node in the chain if they do not have attached to one of their interfaces a service node in the service chain. It should also be noted that VLANs are used by way of non-limiting example only. Any appropriate local identifier may be used, for example, forwarding domain identifier or a virtual route forwarding (vrf) domain identifier.

In block 11410, if VEM 22 finds that a service node attached to one of its interfaces is the next hop in the service chain, VEM 22 forwards packet 1002 to the service node. For example, in the case of VEM 22(4) of FIG. 10, SLB 1020 is connected to interface 34-4. So VEM 22(4) forwards packet 1002 to SLB 1020 for servicing. SLB 1020 services the packet according to its ordinary native function, including marking it for forwarding to the next hop on the VLAN, which may also be the next hop in the service chain. SLB 1020 then returns packet 1002 to VEM 22(4) via interface 34-4. In block 1150, VEM 22 identifies the service chain and hence the next hop based on the VLAN associated with packet 1002. In block 1190, the method is completed and/or the method can be repeated.

Figure 12:
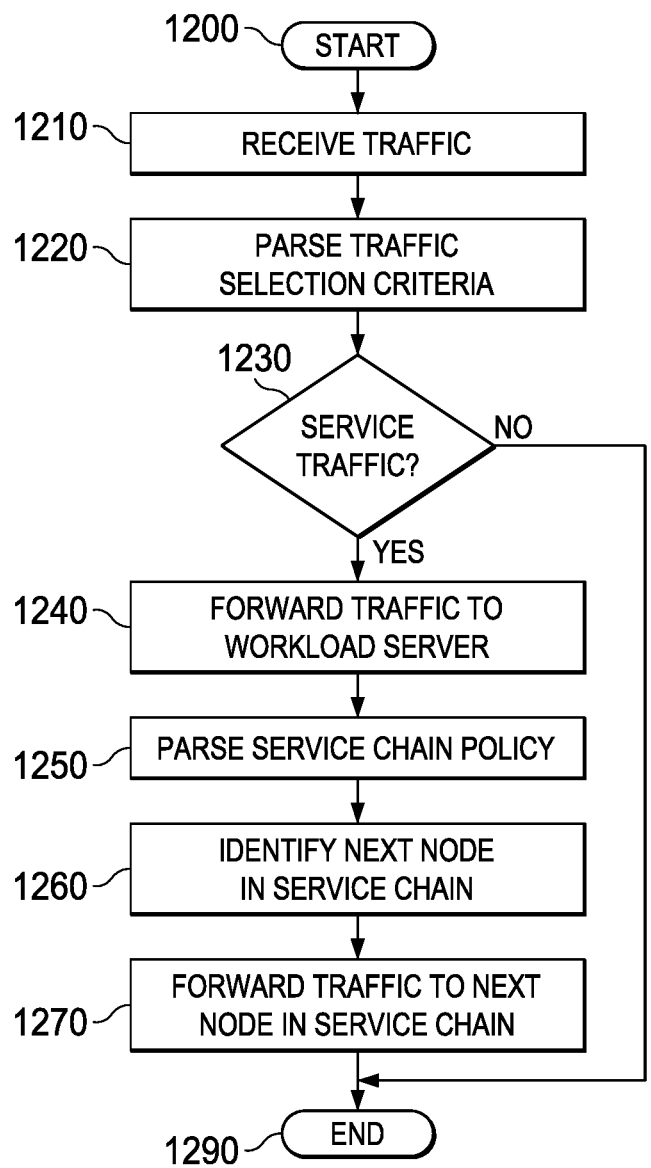
FIG. 12 is a flow diagram illustrating yet other example details of an embodiment of the communication system.

FIG. 12 is a flow diagram illustrating yet other example details of an embodiment of the communication system.

Starting in block 1200, in block 1210, the system receives incoming traffic.

In block 1220, the system parses traffic selection criteria.

In decision block 1230, the system determines whether the parsed traffic is service traffic. If not, in block 1290, the method is done.

If the traffic is service traffic, then in block 1240, the system forwards the traffic to a workload server.

In block 1250, the system parses the service chain policy.

In block 1260, the system identifies the next node in the service chain.

In block 1270, the system forwards the traffic to the next node in the service chain.

In block 1290, the method is done.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, DVS 14. In some embodiments, one or more of these features may be implemented in hardware, provided external to these elements, or consolidated in any appropriate manner to achieve the intended functionality. The various network elements (e.g., DVS 14, service controller 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, DVS 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 54) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 52) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended Claims. In order to assist the United States Patent and Trademark Office (USPTO) and, additionally, any readers of any patent issued on this application in interpreting the Claims appended hereto, Applicant wishes to note that the Applicant: (a) does not intend any of the appended Claims to invoke paragraph six (6) of 35 U.S.C. section 112 as it exists on the date of the filing hereof unless the words "means for" or "step for" are specifically used in the particular Claims; and (b) does not intend, by any statement in the Specification, to limit this disclosure in any way that is not otherwise reflected in the appended Claims.

The invention claimed is:

1. A method comprising:
receiving an in-path network packet of a service insertion architecture on a network interface;
classifying the network packet into a service chain that includes an agentless service node that is not service chain aware;
associating the service chain with a local identifier; and
forwarding the network packet to a path corresponding to the local identifier and to a service node configured to apply a service to the network packet.

2. The method of claim 1, wherein the local identifier is a virtual local area network (VLAN) identifier.

3. The method of claim 2, wherein associating the service chain with a local identifier comprises associating the VLAN with a service path identifier.

4. The method of claim 1, wherein, the local identifier includes a mapping to enable the agentless service node to follow a servicing order of the service chain.

5. The method of claim 1, wherein the service is an edge service.

6. The method of claim 1, wherein the service node is an agentless service node of the service insertion architecture.

7. A network device comprising:
a network interface; and
logic, at least partly implemented in hardware, operable to:
receive an in-path network packet of a service insertion architecture on the network interface;
classify the network packet into a service chain that includes an agentless service node that is not service chain aware;
associate the service chain with a local identifier; and
forward the network packet to a path corresponding to the local identifier and to a service node configured to apply a service to the network packet.

8. The network device method of claim 7, wherein the service chain is a service chain.

9. The network device of claim 7, wherein the local identifier is a virtual local area network (VLAN) identifier.

10. The network device of claim 9, wherein associating the service chain with a local identifier comprises associating the VLAN with a service path identifier.

11. The network device of claim 7, wherein forwarding the network packet comprises forwarding the network packet to a service node configured for providing a service to the network packet.

12. The network device of claim 11, wherein the service is an edge service.

13. The network device of claim 11, wherein the service node is an edge service node.

14. One or more tangible, non-transitory storage mediums having stored thereon logic operable for instructing a processor for:
receiving an in-path network packet of a service insertion architecture on a network interface;
classifying the network packet into a service chain that includes an agentless service node that is not service chain aware;
associating the service chain with a local identifier; and
forwarding the network packet to a path corresponding to the local identifier and to a service node configured to apply a service to the network packet.

15. The one or more tangible, non-transitory storage mediums of claim 14, wherein the service chain is a service chain.

16. The one or more tangible, non-transitory storage mediums of claim 14, wherein the local identifier is a virtual local area network (VLAN) identifier.

17. The one or more tangible, non-transitory storage mediums of claim 16, wherein associating the service chain with a local identifier comprises associating the VLAN with a service path identifier.

18. The one or more tangible, non-transitory storage mediums of claim 14, wherein forwarding the network packet to a path corresponding to the local identifier comprises forwarding the network packet to a service node configured for applying a service to the network packet.

19. The one or more tangible, non-transitory storage mediums of claim 18, wherein the service is an edge service.

* * * * *